United States Patent
Zitsch et al.

(10) Patent No.: US 11,927,823 B2
(45) Date of Patent: Mar. 12, 2024

(54) CABLE ASSEMBLY

(71) Applicant: TE CONNECTIVITY SERVICES GMBH, Schaffhausen (CH)

(72) Inventors: Dwight David Zitsch, Carlisle, PA (US); Robert Nelson Fair, Jr., York, PA (US)

(73) Assignee: TE Connectivity Solutions GmbH (CH)

( * ) Notice: Subject to any disclaimer, the term of this patent is extended or adjusted under 35 U.S.C. 154(b) by 0 days.

(21) Appl. No.: 17/665,162

(22) Filed: Feb. 4, 2022

(65) Prior Publication Data
US 2022/0283392 A1  Sep. 8, 2022

Related U.S. Application Data

(60) Provisional application No. 63/154,552, filed on Feb. 26, 2021.

(51) Int. Cl.
*G02B 6/44* (2006.01)
*G02B 6/245* (2006.01)

(52) U.S. Cl.
CPC ............. *G02B 6/448* (2013.01); *G02B 6/245* (2013.01)

(58) Field of Classification Search
CPC ................................ G02B 6/448; G02B 6/245
USPC ........................................................... 385/114
See application file for complete search history.

(56) References Cited

U.S. PATENT DOCUMENTS

| | | | |
|---|---|---|---|
| 11,169,331 B2 | 11/2021 | Zitsch et al. | |
| 2002/0102088 A1* | 8/2002 | Kondo | G02B 6/3897 385/134 |
| 2004/0126069 A1* | 7/2004 | Jong | G02B 6/3878 385/109 |
| 2019/0004257 A1* | 1/2019 | Anderson | G02B 6/3834 |
| 2020/0225431 A1* | 7/2020 | Zitsch | G02B 6/443 |

OTHER PUBLICATIONS

European Search Report, dated Aug. 1, 2022, EP 22 15 8302, International Application No. 22158302.4-1020.

* cited by examiner

*Primary Examiner* — Jerry M Blevins

(57) ABSTRACT

An optical cable assembly comprising: (a) a plurality of fibers; (b) a connector; (c) at least a first flat ribbonized portion comprising at least a first portion of the plurality of fibers, the first flat ribbonized portion being terminated to the connector; and (d) at least a first non-flat portion comprising at least a second portion of the plurality of fibers.

15 Claims, 2 Drawing Sheets

CABLE ASSEMBLY

REFERENCE TO RELATED APPLICATION

This application is based on U.S. Provisional Application No. 63/154,552, filed Feb. 26, 2021, which is incorporated herein by reference.

FIELD OF INVENTION

The present invention relates generally to an optical circuit, and, more particularly, to an optical circuit having flexible portions.

BACKGROUND

Applicant has discovered significant shortcomings in multifiber cable assemblies. Conventional termination of multiple fiber cable assemblies requires typically ribbonizing multiple fibers to create a flat section for termination in a ferrule, for example, an MT ferrule. The problem with this approach is the ribbonized portions of the cable assembly cannot bend in plane and can only bend out of plane, thus, severely restricting the flexibility of a ribbon cable. Moreover, the ribbonized portion tends to be weak in cross-sectional strength, causing it to roll up when the heat shrink fiber protection is added. This roll up can result in higher insertion loss due to micro-bending at the transition. Applicant has found that the ribbonized portion requires typically a minimum length of two inches to prevent this roll-up condition. Still another shortcoming of the ribbonized cable is that other protection methods such as the addition of furcation tubing for protection cannot be terminated directly to the MT ferrule, without the use of a transition to ribbon fiber.

What is needed is a cable assembly configured for termination to MT ferrules, which is flexible and minimizes micro-bending. The present invention fulfills this need, among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Applicant has developed an approach for configuring a fiber assembly with ribbonized and non-ribbonized portions that allow the assembly to be readily connectorized at the ribbonized portions, yet allows axial bending at the non-ribbonized portions. More specifically, the non-ribbonized portions reconfigure the fibers in the ribbonized portions to eliminate the rigid planar alignment of the fibers, thus allowing them to bend freely in any direction. Such an approach facilitates the implementation of full axial flex sections anywhere along the length of normally flat ribbon cable, or along legs extending from optical circuits. Moreover, the addition of a sheathing over the non-ribbonized portions protects these sections, which would otherwise have exposed fragile discrete fibers.

In one embodiment, the present invention relates to an optical cable assembly comprising: (a) a plurality of fibers; (b) a connector; (c) at least a first flat ribbonized portion comprising at least a first portion of the plurality of fibers, the first flat ribbonized portion being terminated to the connector; and (d) at least a first non-flat portion comprising at least a second portion of the plurality of fibers.

The present invention also relates to a method of preparing an optical cable assembly. In one embodiment, the method comprises (a) stripping at least a first portion of a flat ribbonized cable, and leaving at least a second portion of the cable unstripped, wherein the at least first portion defines at least one non-flat portion, and the at least second portion defines at least one flat portion, wherein the at least one flat portion is at an end of the cable and the at least one non-flat portion is interior to the at least one flat portion on the cable; (b) terminating the at least one flat portion with a connector; and (c) encasing the at least one non-flat portion with a sheathing, wherein fibers within the at least one non-flat portion are free to move with respect to each other. In another embodiment, the method comprises: (a) routing a plurality of fibers on a substrate, wherein each of the plurality of fibers has two end portions, each of the end portions extends from the substrate, wherein one or more end portions of different fibers of the plurality of fibers are grouped in at least a first leg and a second leg, wherein at least the first leg comprises a plurality of the end portions of different fibers; (b) ribbonizing a distal portion of at least the first leg such that a proximate portion of the first leg adjacent the substrate is not ribbonized; (c) connectorizing the distal portion of the first leg; and (d) sheathing at least the proximate portion the first leg, wherein fibers in the proximate portion of the first leg are free to move with respect to each other and to bend in any direction.

The approach of the present invention has significant benefits. For example, this technique imparts flexibility in thin fiber sections by only increases the thickness in sections that require full axial flex. Additionally, the present disclosure may be combined with the teachings of U.S. application Ser. No. 16/562,023, filed 5 Sep. 2019, in which heat shrink sheathing (e.g., Versafit) can be terminated directly to a ferrule, thereby replacing the mini-boot. More specifically, in one embodiment, the sheathing is thin-walled and allows for the application of an oval spring in the flat section behind the MT ferrule.

Additionally, based on the present disclosure, the length of the flat portion behind the MT ferrule may be reduced without enduring the rolling effect on the ribbon, as with conventional optical cables. Thus, rather than requiring at least two inches behind the ferrule, the flat portion length can be reduced to less than an inch from the MT ferrule face.

Further, the present disclosure allows for variations in the configuration of the optical assembly. For example, in one embodiment, the optical assembly may include multiple round sections within a given flat length or one long round section between the end flat sections for MT ferrule termination. In other embodiments, the fiber sheathing protection may only cover the transition from flat to round and back to flat again. For example, flat ribbon sections may remain uncovered if additional fiber protection is not required, further reducing the thickness in these areas. Again, still other embodiments will be obvious to those of skill in the art in light of this disclosure.

DETAILED DESCRIPTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Figure 1:
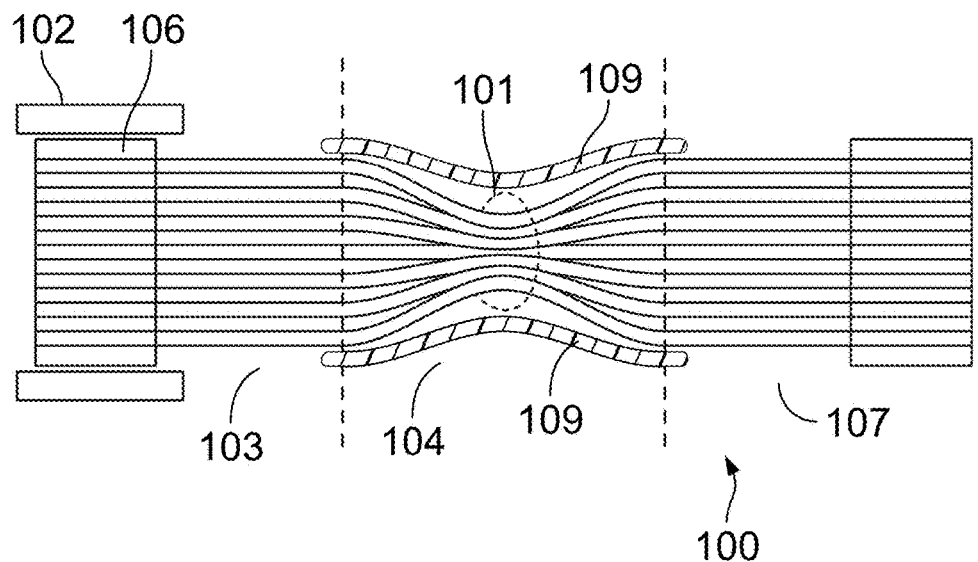
FIG. 1 is a cross section of a schematic of one embodiment of the cable assembly of the present invention.

Referring to FIG. 1, one embodiment of an optical cable assembly 100 of the present invention is shown. The optical cable assembly 100 comprises a plurality of fibers 101, a connector 102, at least a first flat ribbonized portion 103 comprising at least a first portion of the plurality of fibers, the first flat ribbonized portion being terminated to the connector; and at least a first non-flat portion 104 comprising at least a second portion of the plurality of fibers. These features are discussed below in greater detail, and in connection with selected alternative embodiments.

In one embodiment, the flat portion is ribbonized. Ribbonizing fibers is well-known, and will not be addressed herein in detail. Suffice to say that ribbonizing a fiber array typically involves aligning a plurality of fibers (e.g., fibers having a diameter of 250 um) in a side-by-side orientation along one plane, and then applying a binder to hold the fibers in this relative position. Ribbonizing fibers is commonly used to manage/control cable assemblies, and/or to facilitate termination to a connector. As is known, to terminate a ribbonized cable, a portion of the ribbon is stripped of the binder and the fibers' buffer coating to expose the bare fibers (which are typically 125 um in diameter), and then the bare fibers are secured in a ferrule.

In one embodiment, the ferrule is an MT type ferrule, although the fibers may be terminated with any known ferrule and/or optical connector, including, for example, an MPO connector for multifiber terminations, or LC or FC connector type connectors for single-fiber terminations.

In one embodiment, the flat portion comprises at least a single row of the plurality of fibers. The number of fibers in a row may vary. For example, in one embodiment, a row of fibers comprises twelve (12) fibers, which is a common configuration for an MT ferrule, although it should be understood that the row may contain any number of fibers to cooperate with the appropriate ferrule.

Figure 4:
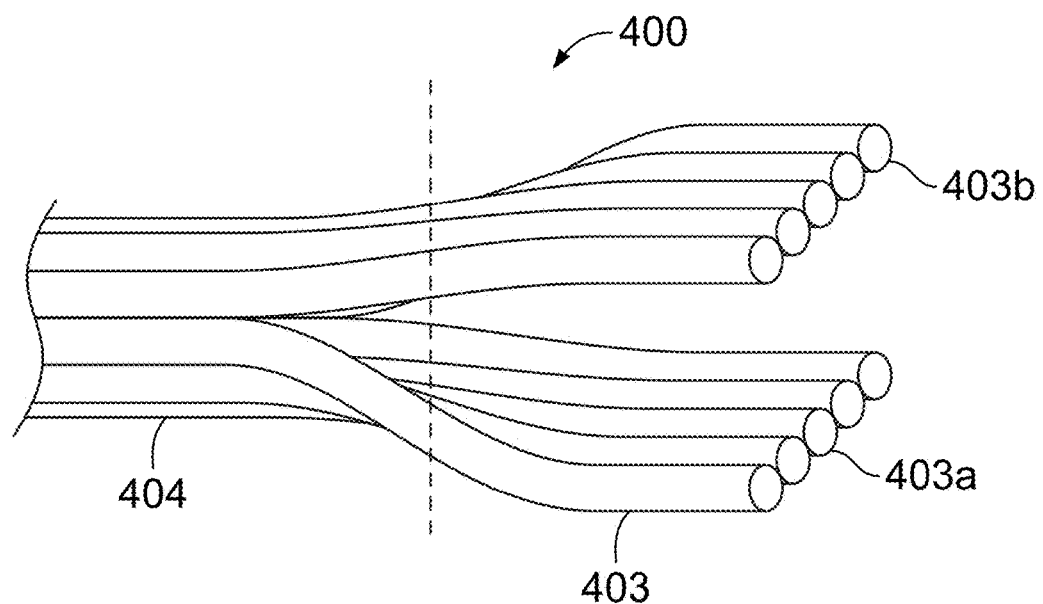
FIG. 4 is a perspective view of an optical assembly of the present invention having multiple stacked rows.

In one embodiment, the flat portion comprises two or more stacked rows of the plurality of fibers. For example, referring to FIG. 4, a multi-row cable assembly 400 is shown. As shown, the cable assembly 400 comprises a flat portion 403 having two stacked rows of fibers 403A and 403B. The two rows of fibers combine to form a non-flat portion 404 of cable assembly 400. Such embodiment may be preferred when the cable assembly is terminated with MT ferrule having multiple rows of fibers such as the 24 fiber MT ferrule which has two rows of 12 fibers. (It should be noted that the multi-layer approach requires a longer setback (e.g., about 2 in.) from the MT ferrule endface to allow for individual stripping of the ribbon fibers.) Again, the invention is not restricted to any particular ferrule configuration regarding the number of stacked rows or the number of fibers in each row.

In one embodiment, the cable assembly comprises a second flat portion 107 as shown in the cable assembly 100 of FIG. 1. The second flat portion may comprise the same fibers of the plurality of fibers 101 that are in the first flat portion or it may be a different selection of fibers from a plurality of fibers 101. For example, the cable assembly 100 may be configured to break out fibers in different connectorized groups. In the embodiment shown in FIG. 1, the group of fibers of the first flat portion and the group of fibers of the second flat portion are the same.

In one embodiment, the second flat portion is terminated to a second connector. Again, the connector can be any known optical connector such as, for example, an MT ferrule connector such as the MPO connector. In embodiments where the optical assembly is used as a breakout wherein the group of fibers in the second flat portion may be fewer than those of the first flat portion, it may be common for the second connector to be a different size, or even a single-fiber connector such as an LC connector. For example, in such an embodiment, the second connector may comprise a plurality of second connectors, each connected to a different subgroup of the fibers of the group of fibers in the first flat portion. It will be obvious to those of skill in the art in light of this disclosure of different connector configurations.

Although the flat portions in FIG. 1 are depicted as being terminated with connectors, the flat portion need not be terminated to a connector. For example, referring to FIG. 2, an embodiment is shown a cable assembly 200 is shown having multiple portion multiple flat portions 203, 207, and 223, of which flat portion 223 is not terminated to a connector but rather connected to non-flat portions 224 and 204 shown in FIG. 2.

The flat portions may be formed in different ways. In one embodiment, portions of a plurality of fibers are ribbonizing as described above. Alternatively, rather than ribbonizing portions of the fibers, the process may start with entire cable which is ribbonized and sections of the cable assembly may be stripped of the binder such that the fibers are allowed to move freely with respect to one another, and, therefore, form non-flat portions. Still other techniques will be obvious to those of skill he art in light of this disclosure.

In one embodiment, the flat portions of the cable assembly of FIG. 1 are adjacent non-flat portions. As mentioned above, non-flat portions reconfigure the fibers in the flat portions to eliminate the rigid planar alignment of the fibers, thus allowing them to bend freely in any direction. In one embodiment, the fibers are arranged simply as a bunch with no adhesion between them. The bunch can have various cross-sections, such as, for example, roughly circular, annular, or even rectilinear if the non-flat portion needs to fit through an orifice of a particular form factor.

As mentioned above, not only does the non-flat portion facilitate bending the cable assembly in any direction, but also it relieves stress is in the cable assembly such that the flat portions do not have to be as long to resist curling as described above. For example, in one embodiment, the non-flat portions allow the flat portions to be shorter than 2 inches from the end of the ferrule. Indeed, in one embodiment, the flat portions are less than an inch long. Again, those of skill in the art can optimize the length of the non-flat portions in light of this disclosure.

Figure 2:
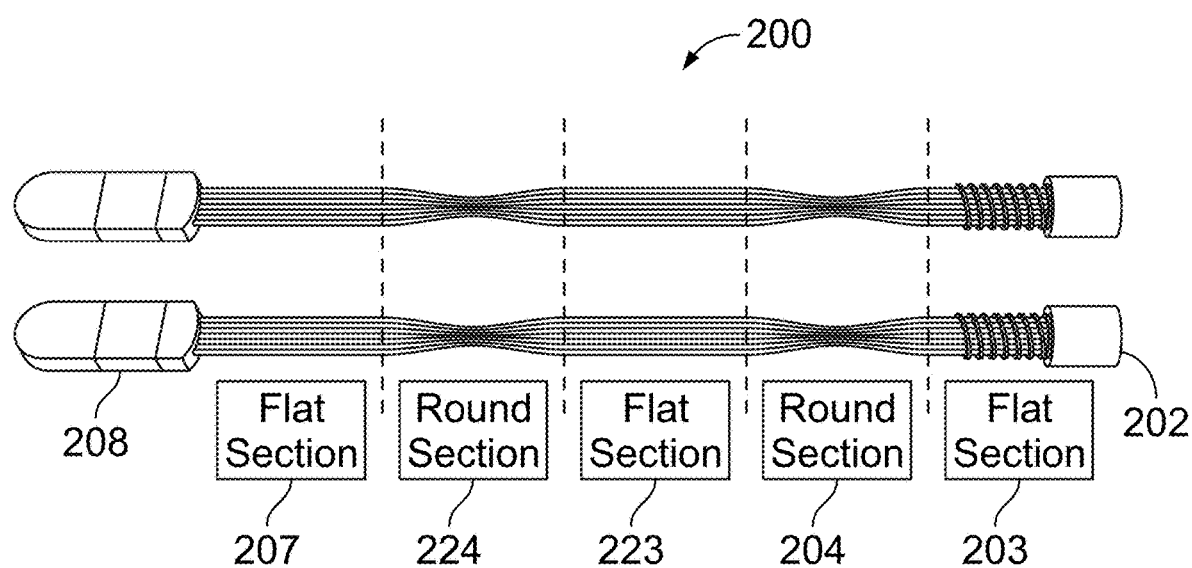
FIG. 2 shows two cable assemblies of the present invention having multiple flat portions and non-flat portions.

In one embodiment, the cable assembly comprises at least a second non-flat portion comprising at least a fourth portion of the plurality of fibers. For example, referring to FIG. 2, the cable assembly 200 comprises multiple non-flat sections 204, 224. In the embodiment of FIG. 2, the group of fibers in the flat sections and the round sections are the same because the entire plurality of fibers is included in each of the flat and non-flat portions. Likewise, in FIG. 1, the group of fibers in the flat portions is the same as the group of fibers in the non-flat section 104. As in the embodiment of FIG. 2, an embodiment of FIG. 1, all of the plurality of fibers are in each flat and non-flat portion.

However, as mentioned above, other embodiments exist. For example, if the cable assembly is used as a fanout for fiber distribution, different groupings of the plurality of fibers can be found in the in different flat and/non-flat portions of the cable assembly. This is particularly likely if the cable assembly incorporates an optical circuit as described below.

In one embodiment, the fiber assembly is integrated with an optical circuit, and, in a more particular embodiment, a flexible optical circuit. Such circuits are well known. A conventional flexible optical circuit comprises a flexible substrate having an adhesive surface upon which optical fibers are routed and adhered such that the fibers are organized and held in place to maintain a minimum bend radius. A length of each fiber extends from the substrate. Often the fibers extending from the substrate are grouped in legs.

As is known, flexible optical circuits are useful in managing fibers to provide optical fiber harnesses and breakouts. As mentioned in U.S. patent application Ser. No. 16/562,023, which is co-pending application by Applicant, there is stress in the fibers at the point the fibers extend from the substrate. The stress can be mitigated using the teachings of the present invention. More specifically, in one embodiment, the fibers extending from the substrate are grouped in a non-flat portions thereby allowing them to flex and thereby alleviate stress.

In a breakout, a fiber in one group of fibers in a leg may be routed and grouped with different fibers in another group in a different leg, or the fiber may be a single fiber in a leg. Such routing patterns are known. Generally the fibers in a given leg will be terminated with a common connector. Thus, the groups of fibers among the different connectors in a flexible optical circuit of FIG. 3 may vary.

Figure 3:
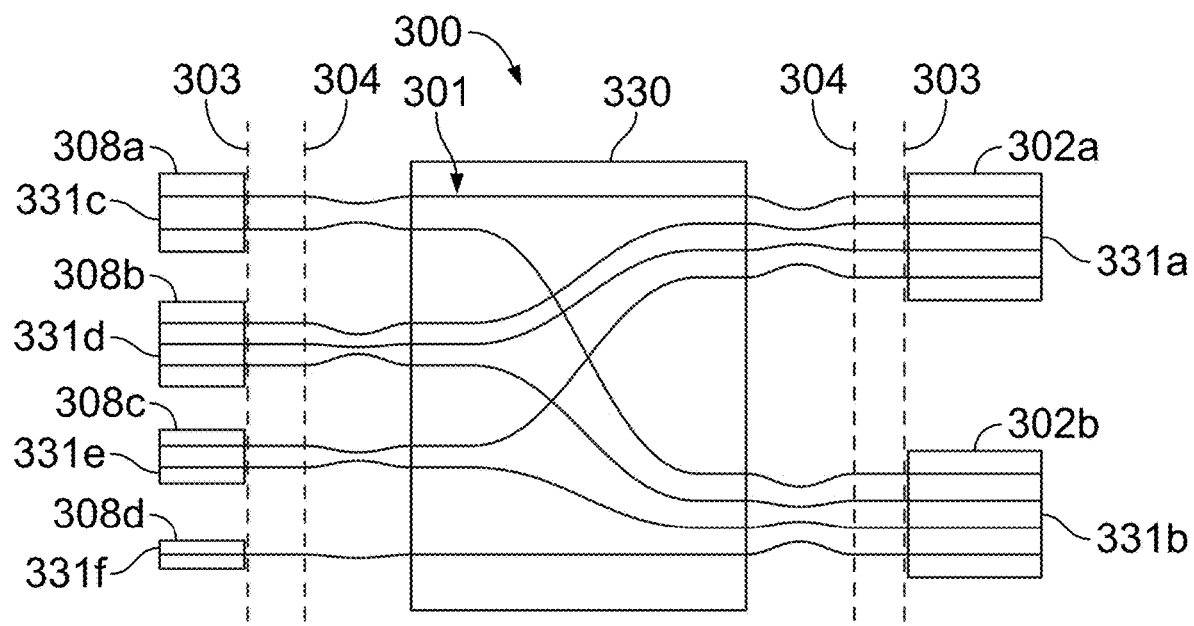
FIG. 3 is a schematic of an optical assembly of the present invention incorporating a flexible optical circuit.

More specifically, referring to FIG. 3, a schematic diagram of one embodiment of a cable assembly 300 of the present invention is shown integrated with an optical circuit. As shown, the cable assembly 300 comprises a substrate 330 upon which a plurality of fibers 301 are adhered in a predetermined pattern. It should be understood that optical fibers can be laid down in a variety of complex patterns and optical circuits. This is well known and will not be discussed in detail herein. For simplicity, FIG. 3 illustrates a simple pattern with relatively few fibers. In this particular embodiment, the cable assembly 300 defines a plurality of legs 331a-f, each containing different groupings of the plurality of fibers 301, although any number of legs in any configurations is possible. Considering legs 331a in detail, a first group of fibers extends from the substrate 330 in a non-flat portion 304, which then transitions into a flat portion 303 which terminates in connector 302a. For simplicity, in this example, just four (4) fibers are in this group. Likewise, in leg 331b, a different second group of fibers extends from the substrate 330 in a non-flat portion which transitions into a flat portion, which then terminates in connector 302b. The fibers terminated in connectors 302a and 302b are arranged on substrate 330 to recombine them in different groups in connectors 308a-d. More specifically, a fiber from the first group and the second group extends in leg 331c initially in a non-flat portion which then transitions to a flat portion, which is terminated in connector 308a. In leg 331d, two fibers from the first group are combined with one fiber from the second group and are terminated in connector 308b. Like leg 331c, leg 331e comprises a fiber from the first and second group. Leg 331f comprises just a single fiber from the second group. Again, the number of fibers, the number of legs, and the groupings of fibers in each leg are infinitely configurable in the optical circuit of the present invention.

An alternative embodiment of the configuration above involves incorporating an optical flex circuit, where non-linear patterns of fibers would be routed on a permanent substrate with adhesive, and linear sections of fibers would be routed on a temporary substrate and masked prior to the application of conformal coating. The masked areas remain as discrete fibers. In one embodiment, a heat shrink sheathing, such as Versafit, may be added over these discrete fibers, creating the desired full-axial flex section within the optical flex circuit.

In one embodiment, sheathing covers at least a portion of the plurality of fibers. More specifically, as shown in FIG. 1, a sheathing 109 encases fibers 101 to provide chemical and/or abrasive protection. In this particular embodiment, the sheathing 109 encases the fibers only in the non-flat portion 104. Alternatively, in the embodiment of FIG. 2, the sheathing encases the entire length of the cable assembly 200. Although these embodiments show the entire cable assembly enclosed in a sheathing, other embodiments are possible. For example, in the embodiment of FIG. 3, only the fibers extending from the substrate are encased in a sheathing.

In one embodiment, the sheathing around the ribbon cable also contacts the rear end of the ferrule to form a tight seal that prevents the epoxy or other adhesive from flowing out of the rear opening. Conversely, in the prior art, a boot is necessary to essentially plug the rear opening of the ferrule to prevent epoxy from leaking out. Thus, a significant benefit of the sheathed ribbon cable of the claimed invention is not only the abrasion resistance/durability that the sheathing provides, but also the simplicity in terminating a ferrule by eliminating the need for a mini-boot. In one embodiment, the sheathing is a heat shrink material. In one embodiment, the heat shrink sheathing comprises Versafit.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A cable assembly comprising:
a plurality of fibers;
a first connector;
at least a first flat portion comprising at least a first portion of the plurality of fibers, the first flat portion being ribbonized and terminated to the first connector; and
at least a first non-flat portion comprising at least a second portion of the plurality of fibers; and
a substrate upon which the plurality of fibers are affixed in a predetermined pattern, and comprising at least two legs extending from the substrate, wherein a first leg comprises the first non-flat portion and the first flat portion terminated with the first connector, and a second leg comprises a second non-flat portion of at least a third portion of the plurality of fibers, and a second flat portion of the third portion terminated with a second connector.

2. The cable assembly of claim 1, wherein the first and second connectors are MT connectors.

3. The cable assembly of claim 1, wherein at least one of the first or second flat portions comprises at least a single row of the plurality of fibers.

4. The cable assembly of claim 1, wherein at least one of the first flat or second portions comprises two or more stacked rows of the plurality of fibers.

5. The cable assembly of claim 1, wherein at least one of the first or second non-flat portion comprises a radial distribution of the plurality of fibers.

6. The cable assembly of claim 1, wherein the second connector comprises a plurality of connectors, each of the plurality of connectors connected to at least one fiber of the third portion of the plurality of fibers.

7. The cable assembly of claim 1, wherein the first, second, and third portions are the same.

8. The cable assembly of claim 1, wherein the first and second portions are the same and the third portion is different from the first and second portions.

9. The cable assembly of claim 1, further comprising:
a third leg extending from the substrate, the third comprising a third non-flat portion of at least a fourth portion of the plurality of fibers, and a third flat portion of the fourth portion terminated with a third connector.

10. The cable assembly of claim 9, wherein first and second portions are the same, and the third portion is different from the first and second portions, and the fourth portion is different from the first, second and third portions.

11. The cable assembly of claim 1, wherein the substrate is flexible.

12. The cable assembly of claim 1, further comprising:
a sheathing over at least the first or second non-flat portions and over any transition between a flat portion and a non-flat portion, the sheathing being heat-shrink sheathing.

13. A method of preparing a cable assembly, the method comprising:
routing a plurality of fibers on a substrate in a predetermined pattern, wherein each of the plurality of fibers has two end portions, each of the end portions extends from the substrate, wherein one or more end portions of different fibers of the plurality of fibers are grouped in at least first and second legs extending from the substrate, wherein at least the first leg comprises a plurality of the end portions of different fibers, and comprises a first non-flat portion proximate the substrate and a first flat portion distal from said substrate;
ribbonizing the first flat portion of at least the first leg such that the non-flat portion is not ribbonized;
connectorizing the first flat portion of the first leg; and
sheathing at least the non-flat portion of the first leg, wherein fibers in the proximate portion of the first leg are free to move with respect to each other and to bend in any direction.

14. The method of claim 13, wherein the plurality of fibers are grouped in more than two legs, wherein at least one of the more than two legs comprises just one of the end portions; and wherein connectorizing comprises also connectorizing the at least one of the more than two legs.

15. The method of claim 13, further comprising:
a sheathing over a non-flat portion and over any transition between a flat portion and a non-flat portion, said sheathing being heat-shrink sheathing.

* * * * *